A. TURNER, dec'd.,
L. A. DOHERTY, Assignee.
Child's Table Tray.

No. 9,285. Reissued July 6, 1880.

Witnesses:
Henry Ewling
Robt. H. Duncan

Inventor.
Lucy A. Doherty

N. PETERS, PHOTO-LITHOGRAPHER, WASHINGTON, D. C.

UNITED STATES PATENT OFFICE.

LUCY A. DOHERTY, OF BOSTON, MASSACHUSETTS, ASSIGNEE OF ALEXANDER TURNER, DECEASED.

CHILD'S TABLE-TRAY.

SPECIFICATION forming part of Reissued Letters Patent No. 9,285, dated July 6, 1880.

Original No. 90,036, dated May 11, 1869. Application for reissue filed March 26, 1880.

*To all whom it may concern:*

Be it known that ALEXANDER TURNER, deceased, assignor to LUCY A. DOHERTY, of the city of Boston, in the State of Massachusetts, did invent a new and useful Improvement in Children's Table-Trays, of which the following is a full, clear, and exact description.

The present invention relates to trays adapted for the use of children in taking their meals while seated at the table, and which for this purpose are designed to be placed on the table directly in front of the child and to receive the usual dishes—a plate, cup, or mug, &c.—which contain the child's food and drink, and which are provided with devices to prevent them from being pushed upon the table.

The tray or waiter heretofore generally used for this purpose is described in Letters Patent No. 38,519 granted to Nathaniel Waterman May 12, 1863, and has been provided with a rim or upwardly-projecting flange extending around its back and sides, but with no rim upon its front or part next to the child. The side and back rims in this tray formed the desired barrier or protection to prevent the food and dishes from being pushed off from the tray upon the table; but the absence of the rim from its front part permitted any fluid which might be spilled into the tray to flow freely over the front edge and run down upon the hanging portion of the table-cloth and upon the clothes of the child. A partially-compensating advantage for the absence of a front rim in the Waterman construction was the fact that there was nothing on the front of the tray to interfere with or discommode the arms of the child.

It is the object, in part, of the present invention to remedy the above-named defect, and at the same time avoid the use of any device which will materially interfere with or discommode the arms of the child; and to this end the invention consists in a child's table-tray having a front rim, but of less height than its side and back rims.

A further object of the present invention is to provide a tray having stops projecting down from near the front corners of the tray to take against the edge of the table, in the manner hereinafter described.

Figure 3:
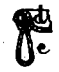
Figure 2:
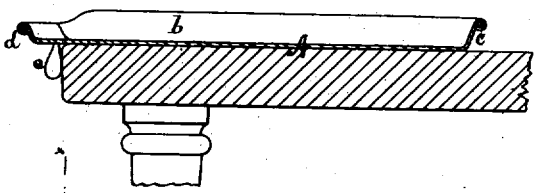
Figure 1:
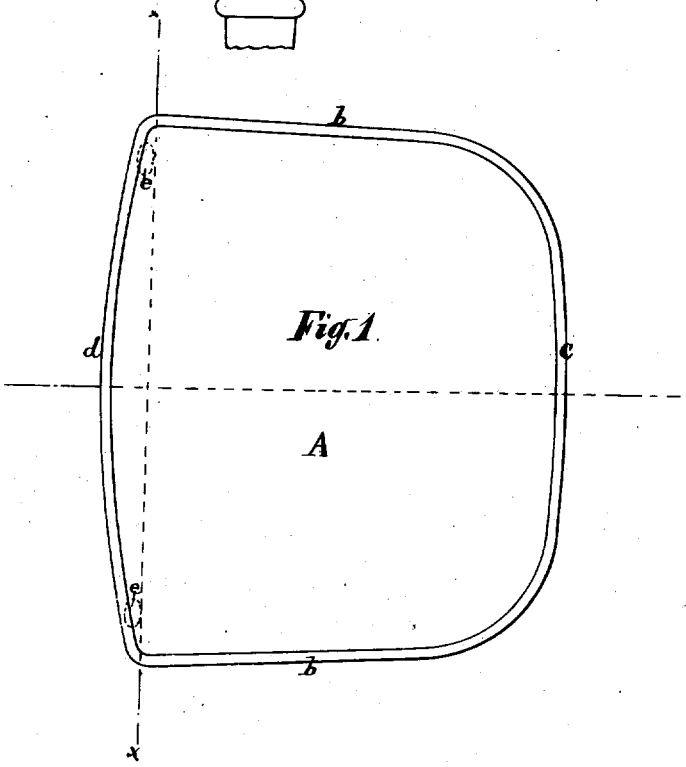

In the accompanying drawings, Figure 1 represents a plan view of the tray; Fig. 2, a sectional view of the same on the line *x x* of Fig. 1, the tray being represented as placed on a table in the position for use; and Fig. 3, a section through one of the stops.

In these drawings, A represents the bottom of a tray; *b b*, *c*, and *d*, rims or flanges attached to the bottom of the tray and extending upward to the desired height, *b b* being the rims on the sides, *c* the rim on the back or rear, and *d* that on the front part of the tray, and *e e* represent the stops.

The tray is conveniently formed from a flat piece or blank of sheet metal, of such shape and size as to leave the bottom A of the required dimensions and contour when the rims have been formed.

The back and side rims, *c* and *b b*, should be of sufficient height, without making the tray cumbersome or impairing its symmetry, to prevent the food and dishes of the child from being easily pushed off from the tray upon the table. The front rim, *d*, should be of more limited height, and so low as not to seriously interfere with or discommode the arms of the child, but at the same time it should be high enough to arrest the flow of the small quantity of fluid which is liable to be spilled into the tray when in use.

In making this tray the rims may be conveniently formed by turning up the edges of the blank to the desired height, the blank in such case being cut to the proper size and shape for this purpose, and the edge from which the front rim, *d*, is to be formed being preferably curved to approximately conform to the edges of round tables, and their raw edges may be wired or turned over to present a smooth surface.

The stops *e e* are simply isolated projections—that is, separated from each other—attached near the front corners of the tray, one near each corner, and extending downward sufficiently to have a firm bearing against the edge of the table, and thus prevent the tray from being pushed forward or away from the child unless it is lifted up to the height of the stops. These stops are made of any proper material, as heavy wire or strips of metal, and secured to the tray in any efficient way, and constitute an improvement on the continuous hanging lip described in the said Waterman patent in this respect, that they permit the tray to be used efficiently upon tables whose edges have shorter or sharper curves than that described by the front edge of the tray, whereas, for obvious reasons, such would not be the case with a tray provided with a continuous hanging lip to take against the edge of the table.

What is claimed as new is—

As a new article of manufacture, a child's table-tray having its front rim of less height than the rims upon its sides and back, substantially as and for the purpose set forth.

LUCY A. DOHERTY.

Witnesses:
ROBERT H. DUNCAN,
BENJ. A. SMITH.